United States Patent
Huff et al.

(10) Patent No.: US 10,556,402 B1
(45) Date of Patent: Feb. 11, 2020

(54) COLD FOIL TEMPORARY TATTOO AND PROCESS FOR MAKING THE SAME

(71) Applicant: TMI Acquisition, LLC, Tucson, AZ (US)

(72) Inventors: Chris Huff, Tucson, AZ (US); Mitchell S. Pisik, Tucson, AZ (US)

(73) Assignee: TMI Acquisition, LLC, Tucson, AZ (US)

( * ) Notice: Subject to any disclaimer, the term of this patent is extended or adjusted under 35 U.S.C. 154(b) by 0 days.

(21) Appl. No.: 16/015,094

(22) Filed: Jun. 21, 2018

Related U.S. Application Data

(62) Division of application No. 15/054,096, filed on Feb. 25, 2016, now Pat. No. 10,022,939.

(60) Provisional application No. 62/120,598, filed on Feb. 25, 2015.

(51) Int. Cl.
| | |
|---|---|
| B32B 7/12 | (2006.01) |
| B32B 38/10 | (2006.01) |
| B32B 37/00 | (2006.01) |
| B41F 16/00 | (2006.01) |
| B41F 19/00 | (2006.01) |

(Continued)

(52) U.S. Cl.
CPC ............. *B32B 7/12* (2013.01); *B32B 37/025* (2013.01); *B32B 37/12* (2013.01); *B32B 38/10* (2013.01); *B32B 2405/00* (2013.01); *B32B 2451/00* (2013.01); *B41F 16/00* (2013.01); *B41F 19/001* (2013.01); *B41F 19/005* (2013.01); *B41F 19/06* (2013.01); *Y10T 156/1741* (2015.01)

(58) Field of Classification Search
CPC ......... B32B 7/12; B32B 37/12; B32B 37/025; B32B 2405/00; B32B 2451/00; B32B 38/10; B41M 3/12; B41F 19/002; B41F 19/001; B41F 19/06; B41F 19/005; B41F 16/0013; B41F 16/0033; B41F 16/00; B41F 5/22; B41F 5/24; B44C 1/1733; B44C 1/105; Y10T 156/174
See application file for complete search history.

(56) References Cited

U.S. PATENT DOCUMENTS

| | | | |
|---|---|---|---|
| 5,565,054 | A | 10/1996 | Lappe |
| 5,641,506 | A | 6/1997 | Talke et al. |
| 6,106,506 | A | 8/2000 | Vineberg |

(Continued)

FOREIGN PATENT DOCUMENTS

| | | |
|---|---|---|
| DE | 20080055141 A1 | 7/2010 |
| EP | 0578706 B1 | 11/1994 |
| EP | 1676702 A1 | 12/2005 |

OTHER PUBLICATIONS

Wikipedia definition of "Cold foil printing" found at https://en.wikipedia.org/wiki/Cold_foil_printing#cite_note-beckmann-4.

*Primary Examiner* — Patricia L. Nordmeyer
(74) *Attorney, Agent, or Firm* — Fennermore Craig, P.C.

(57) ABSTRACT

Described herein is/are cold foil adhesive methods for manufacturing temporary tattoo laminate devices, wherein the tattoos incorporate metallic foil and other decorative components. The methods provide a surprisingly rapid and efficient method for creating tattoo laminate devices which provide crisp, clear multi-color images temporary tattoos for the skin. The methods described herein provide a way to produce, in an offset printing press or flexographic printing press, numerous tattoo laminate devices at very high speeds, with unlimited colors, and crisp, clear images.

17 Claims, 3 Drawing Sheets

(51) Int. Cl.
  *B41F 19/06* (2006.01)
  *B32B 37/12* (2006.01)

(56) References Cited

U.S. PATENT DOCUMENTS

| | | | | |
|---|---|---|---|---|
| 6,106,852 | A | * 8/2000 | Vineberg | A61K 8/0208 |
| | | | | 424/402 |
| 8,417,171 | B2 | 4/2013 | Christopher et al. | |
| 2008/0277067 | A1 | 11/2008 | Weber | |
| 2008/0295710 | A1 | 12/2008 | Ohsawa | |
| 2010/0212821 | A1 | 8/2010 | Grinberg et al. | |
| 2011/0290139 | A1 | 12/2011 | Puschel et al. | |
| 2012/0193024 | A1 | 8/2012 | DeBard et al. | |
| 2013/0059106 | A1 * | 3/2013 | Bayzelon | B32B 7/06 |
| | | | | 428/41.8 |
| 2014/0305577 | A1 * | 10/2014 | Barth | B44C 1/145 |
| | | | | 156/234 |
| 2016/0351083 | A1 * | 12/2016 | Barnhardt | G09F 3/10 |

* cited by examiner

COLD FOIL TEMPORARY TATTOO AND PROCESS FOR MAKING THE SAME

CROSS-REFERENCE TO RELATED APPLICATIONS

This application is a divisional of U.S. nonprovisional patent application Ser. No. 15/054,096 filed Feb. 15, 2016, and claims priority to U.S. provisional application No. 62/120,598 filed on Feb. 25, 2015, both of which are hereby incorporated herein by reference for all that they each disclose.

FIELD OF THE INVENTION

The present invention is in the field of temporary tattoos for application to the skin of humans and animals.

BACKGROUND OF THE INVENTION

The invention relates to the manufacture of temporary tattoos, for application to human and animal skin, primarily but not necessarily only for decorative purposes.

SUMMARY OF THE INVENTION

Described herein are methods for manufacturing temporary tattoo laminate devices for applying temporary tattoos, wherein the tattoos incorporate metallic foil and other decorative components. The methods provide a surprisingly rapid and efficient method for creating tattoo laminate devices which provide crisp, clear multi-color image temporary tattoos for the skin. The methods described herein provide a way to produce, on a printing press such as an offset printing press or a flexographic printing press, numerous tattoo laminate devices at very high speeds, with unlimited colors, and crisp, clear images.

DETAILED DESCRIPTION OF THE INVENTION

The term "temporary tattoo device(s)", "temporary tattoo laminates" and "temporary tattoos" as used herein refer to a multi-layer structure described herein that is used to transfer an image to the skin. Although the temporary tattoo devices described herein are primarily intended for use to apply temporary tattoos to the skin of humans, it is possible for the devices to be used to apply temporary tattoos to animal skin that is not covered in a great amount of hair. In addition, the temporary tattoos described herein can be applied to other types of surfaces, including inanimate (non-living and/or non-biologic) surfaces.

The temporary tattoo produced according to the invention contains at least one foil layer, although typically contains only one foil layer. The term "foil" as used herein means a metal- or metallic-based thin film, or a non-metal or non-metallic film. Preferably, the foil is a metal- or metallic-based film. The foil layer in a tattoo, when applied to the user's skin, provides a desirable metallized, shiny reflective effect to the tattoo.

Prior art temporary tattoos containing foil layers are produced using a hot foil stamping process, utilizing heat and pressure in a letter press. The shape of the die (the die is a metal, usually copper, raised area mounted to the letter press) determines the shape stamped out of the sheet of foil, which is adhered using heat and pressure to other layers in the tattoo structure. The foil used in the prior art is colored and double-sided, and is provided with an adhesive layer that adheres to the next layer in the tattoo structure when the die applies heat and pressure to the other side of the foil. In the prior art process, each color of ink must be applied via a single pass (a single pass for each color) through the letter press, resulting in a very slow process. This process would typically be run on a small format press sheet, due to the maximum sheet size that a typical letter press can run. The hot foil stamping process tends to require a significant amount of labor, to accomplish multiple passes through the letter press, and is generally deficient at providing clear, crisp, images having good registration (i.e., alignment across different colors of ink used in the same image).

Figure 1:
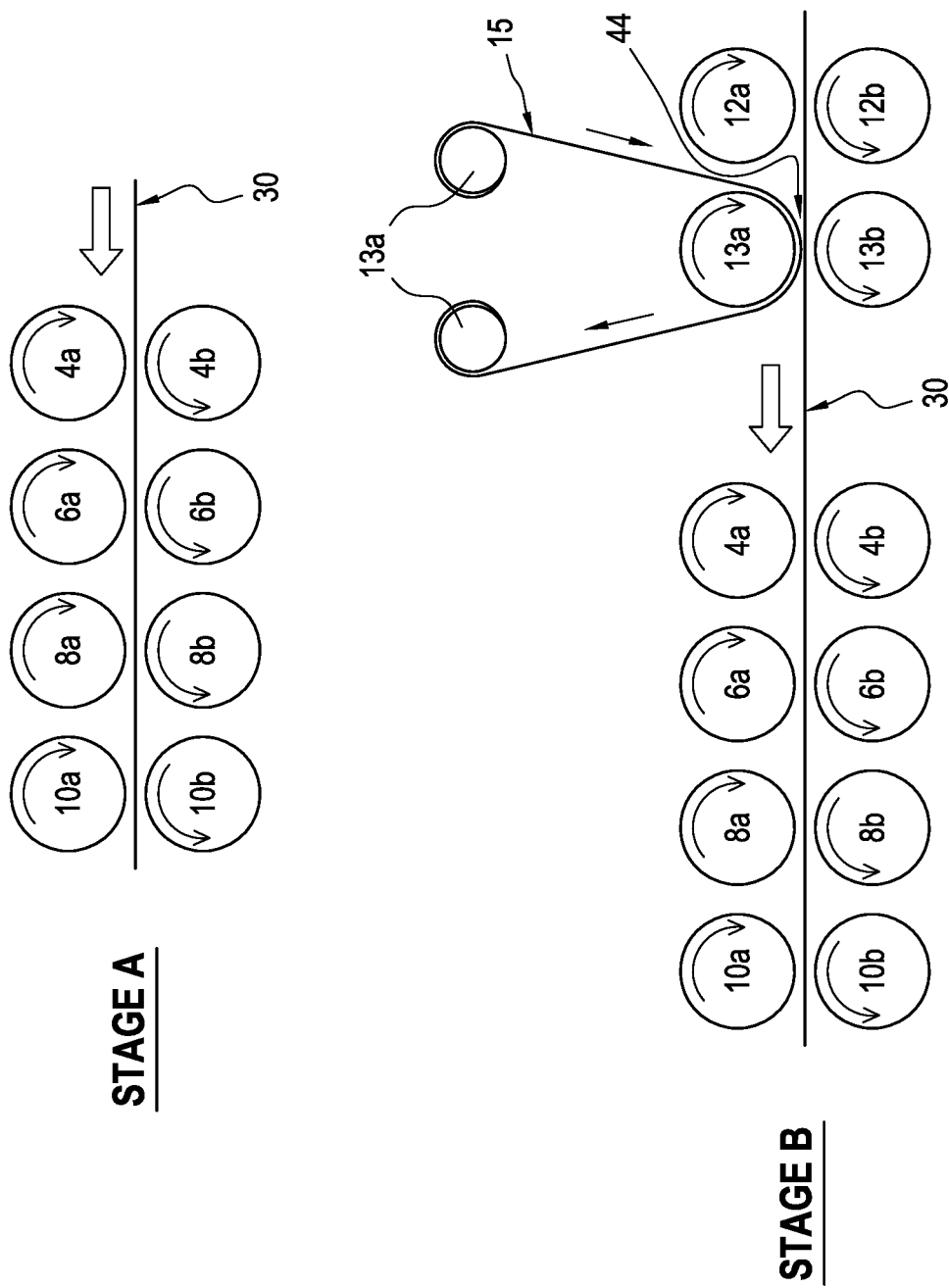
FIG. 1 is a schematic illustration of a method according to an embodiment of the invention using an offset printing press.
Figure 2:
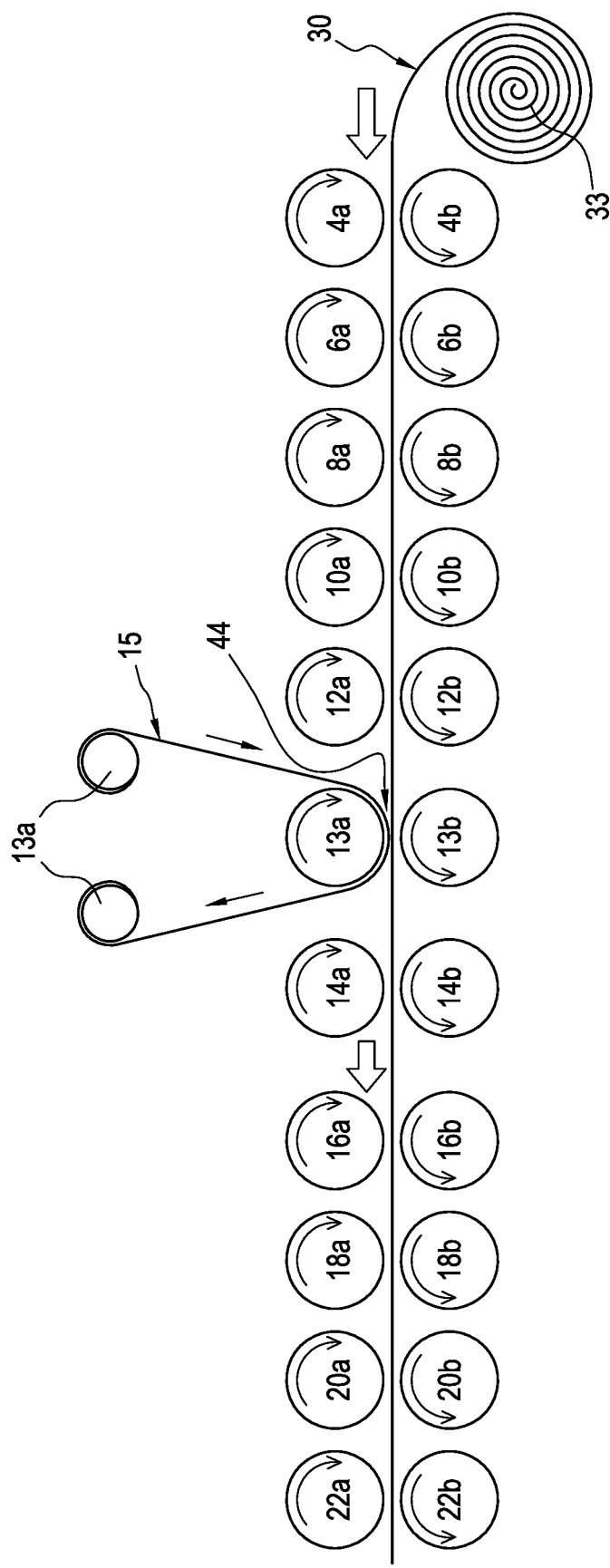
FIG. 2 is a schematic illustration of a method according to an embodiment of the invention using a flexographic printing press.

In contrast, the methods described herein provide a way to produce temporary tattoos at high speeds with greatly reduced labor, using full sized sheets or a continuous sheet in roll form, and with a wide variety of colorings due to the different blends and gradients of inks that are impossible with hot foil. Hot foil, due to the method of application, cannot carry anywhere near the level of detail in the resulting tattoo image that can be accomplished through this printing process. The high speed production of temporary tattoos accomplished by the present invention is accomplished in part due to the use of full sized base sheets when offset printing presses are used (as shown in FIG. 1), or the use of a base sheet in roll form that is continuously fed through a flexography printing press (as shown in FIG. 2).

Hot stamp foil is a much less precise process that does not lend itself to providing fine detail. In contrast, cold foil can handle extremely fine detail. The present method simultaneously produces many more tattoos than can be produced by the prior art, due in part to the present method's ability to use significantly larger sheets than can be run in a typical hot foil system, and also because the present method requires a significantly lower number of passes through a printing press than is required to make a tattoo via the prior art's hot foil method. The present method can use base sheets up to approximately 28"×40", if an offset printing press is used.

The present method preferably uses only one color of foil in a single layer, yet produces tattoos having a huge variety of shapes and colors and other decorative effects. The present method produces tattoos which are sharp and clear and exhibit excellent registration of colors. The method for producing a temporary foil tattoo according to the invention comprises the steps of:

(a) providing a base sheet;
(b) applying ink to the base sheet, to form a first ink layer;
(c) applying a cold foil adhesive to the first ink layer, to form a first adhesive layer;
(d) applying foil to the first adhesive layer, to form a foil layer;
(e) applying ink to the foil layer to form a second ink layer;

(f) applying a second adhesive to the second ink layer, to form a second adhesive layer for contacting a substrate to which the temporary tattoo may be applied; and (g) applying a substantially transparent protective liner top sheet to the second adhesive layer.

Figure 3:
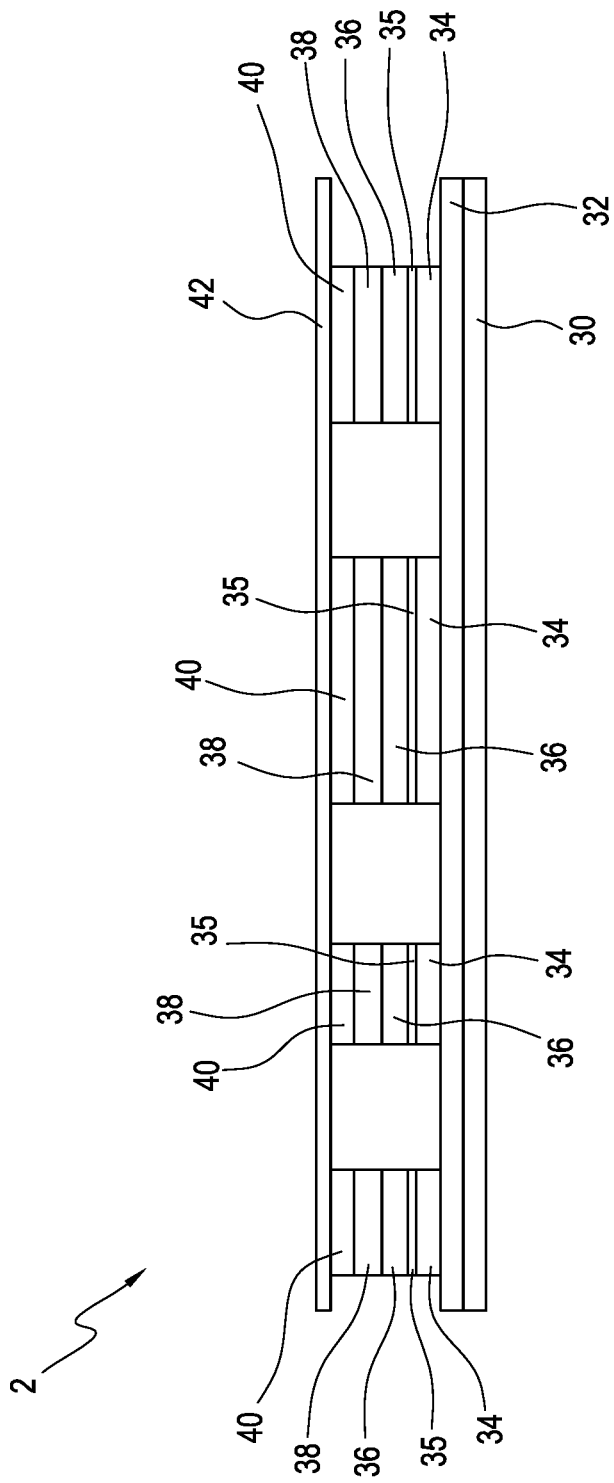
FIG. 3 is an illustration of cross-sectional side view of an embodiment of a temporary foil tattoo produced by a method according to an embodiment of the invention.

FIG. 1 is a schematic illustration of a portion of a method according to one alternative embodiment of the invention wherein an offset printing press is used. FIG. 2 is a schematic illustration of a portion of a method according to yet another alternative embodiment of the invention wherein a flexographic printing press is used. FIG. 3 illustrates an embodiment of a temporary tattoo device that may be produced by the process described herein. The elements shown in the figures are not drawn to scale. FIG. 1 and FIG. 2 do not show the layers (e.g., ink, adhesive, foil) that are built up on the base sheet by the methods.

In FIG. 1, the method occurs in two stages, Stage A and Stage B. The large arrow indicates the direction of travel of the base sheet 30 through the multiple printing units in an offset printing press. Smaller arrows within the elements shown and described herein represent the direction of rotation of each portion of each of the printing units.

Illustrated in FIG. 1 is an embodiment of the method which comprises a four-color ink process, but does not show the application of the layer of adhesive used to adhere the tattoo to the user's skin, and also does not show the application of the removable, substantially transparent, protective liner top sheet over the layer of adhesive.

As shown in FIG. 1, Stage A (also referred to as Pass Number 1) comprises running the base sheet 30 through four consecutive printing units (labeled as 4, 6, 8 and 10, wherein each unit is comprised of two portions, a and b) to deposit a layer of ink on the base sheet 30. (The layer of ink itself may be comprised of several different colors of ink). The example shown in FIG. 1 is a four-color ink process, wherein each printing unit is capable of applying a different color of ink. For example, CMYK ink. After the layer of ink is deposited, the inked base sheet 30 then proceeds to Stage B (also referred to as Pass Number 2), wherein the base sheet bearing the first layer of ink is run through a printing unit (labeled as 12a and 12b) wherein a layer of cold foil adhesive is applied the base sheet bearing the first layer of ink. Then, foil 15 is applied via unit 13a/13b. Thereafter, the base sheet (now bearing a first layer of ink and foil) is run through four consecutive printing units (labeled as 4, 6, 8 and 10, wherein each unit is comprised of two portions, a and b) to apply a second layer of ink. As with the first layer of ink, the second layer of ink may be comprised of several different colors of ink.

Elements 4a and 4b together comprise a first ink printing unit; elements 6a and 6b together comprise a second ink printing unit; elements 8a and 8b together comprise a third ink printing unit; and elements 10a and 10b together comprise a fourth ink printing unit.

A printing unit for applying cold foil adhesive is illustrated by elements 12a and 12b.

A printing unit for applying a layer of foil is illustrated by elements 13a and 13b, with the foil sheet illustrated by element 15.

Not shown in FIG. 1 are additional steps in the method that are used to provide an adhesive layer (for adhering the tattoo to the user's skin or to another substrate to which the user desires to apply the tattoo) as well as to provide a protective top sheet on that adhesive layer. Preferably, the skin adhesive is applied only to the printed areas of the tattoo. In a preferred embodiment, a screen press is used for this precise application of skin adhesive. The screen press is also equipped to apply the protective top sheet immediately following application of the adhesive layer that will bond to the user's skin.

Several steps of the methods are preferably performed by a print unit in an offset printing press, or may be performed by print units in a flexographic printing press. The method may require two or more passes through the printing press. For example, as shown in FIG. 1 and described herein, the tattoo can be made by two passes through an offset printing press. The entire method could be performed in a single pass through an offset printing press, but would require modified equipment to produce tattoos using a four color process. For example, in order for Stage A and Stage B shown in FIG. 1 to occur via one pass through the printing press, it would be necessary to have a press with four additional ink print units in line after the foil is applied.

FIG. 2 shows a method wherein the tattoo is made in part by a single pass through a flexographic printing press. Base sheet 30 is fed in a continuous manner from base sheet roll 33. The large arrows indicate the direction of travel of the base sheet 30 through the multiple printing units in an offset printing press. Smaller arrows within the elements shown and described herein represent the direction of rotation of each portion of each of the printing units. Not shown in FIG. 2 is the application of the layer of adhesive used to adhere the tattoo to the user's skin (or to another desired substrate) or the application of a protective, removable top sheet over the layer of adhesive. Also not shown in FIG. 2 is the step of cutting the tattoo device, which has been formed in a continuous sheet, into smaller portions.

FIG. 2 is an example of the method using a four-color ink process in a flexographic printing press, wherein there are a total of eight ink printing units used. In this method, the base sheet 30 is continuously run through four consecutive printing units (labeled as 4, 6, 8 and 10, wherein each unit is comprised of two portions a and b) to deposit a layer of ink on the base sheet 30. After the layer of ink is deposited, the inked base sheet 30 then proceeds to the next printing unit (labeled as 12a and 12b) wherein a layer of cold foil adhesive is applied the base sheet bearing the first layer of ink. Then, foil 15 is applied in unit 13a/13b. Thereafter, the base sheet (now bearing a first layer of ink and foil) is run through four consecutive printing units (labeled as 14, 16, 18 and 20, wherein each unit is comprised of two portions a and b) to apply a second layer of ink.

Illustrated in FIG. 2 is the application of the layer of adhesive used to adhere the tattoo to the user's skin via print unit labeled 22a and 22b. However, instead of applying that layer of adhesive using a print unit, it can instead be applied to the base sheet 30 (which now bears a first layer of ink, foil, and a second layer of ink) using a screen press (not shown). Preferably, the skin adhesive is applied only to the printed areas of the tattoo. The screen press is also equipped to apply the protective top sheet immediately following application of the adhesive layer that will bond to the user's skin.

Also not shown in FIG. 2 is the step of cutting the tattoo device, which has been formed in a continuous sheet, into smaller portions.

The methods described herein produce a temporary tattoo device 2 for applying temporary tattoos for the skin and other substrates, and is comprised of the following layers, as illustrated in FIG. 3. FIG. 3 is a cross-sectional side view of an embodiment of a temporary tattoo device according to the invention:

(a) a base sheet 30;

(b) a first ink layer 34 on the base sheet;

(c) a first adhesive layer 35, comprising a cold foil adhesive, on the first ink layer 34;

(d) a foil layer 36 on the first adhesive layer 35;

(e) a second ink layer 38 on the foil layer 36;

(f) a second adhesive layer 40 on the second ink layer 38;

(g) a substantially transparent protective liner sheet 42 on the second adhesive layer 40, wherein the protective liner sheet 42 is removable for exposing the second adhesive layer 40 which is placed on a user's skin.

The term "base sheet" as used herein may be a paper sheet or sturdy synthetic film or sheet. The base sheet will have a thickness in the range of about 0.0004 to about 0.012 inches, i.e., between about 4 pt and 12 pt.

Preferably, the base sheet 30 has a coating of a release agent on one side, to assist in separation of the first ink layer and the remainder of the tattoo device from the base sheet. For example, the release agent may be one that releases upon exposure to water, pressure or heat, or to a combination of two or more of water, pressure or heat. Non-limiting examples of potential release agents are starches, dextrin, silicone, although any release agent known to those of skill in the art of temporary tattoos may be employed.

Optionally, the temporary tattoo devices 2 may contain an additional layer, comprising a substantially transparent precoating 32 between the base sheet 30 and the first ink layer 34. This precoating layer is preferably colorless, so as not to obscure the aesthetic components of the tattoo when it is deployed on the user's skin. The precoating should be a skin-safe composition, and is applied to one side of the base sheet. If the base sheet has a coating of a release agent, then the precoating is applied to the side of the base sheet bearing the release agent.

The precoating serves a protective function, by providing a barrier between the ink in the tattoo device and the environment, once the temporary tattoo is transferred to the user's skin. When the temporary tattoo is used to deploy the tattoo on the user's skin, the base sheet will be discarded, leaving behind the tattoo. The precoating, if used, will remain integral with the tattoo, thereby making the tattoo more durable on the user's skin, by increasing the wear-resistance of the tattoo on the skin.

The precoating may be applied in any manner known to one of skill in the art, such as via screen, gravure or offset printing technologies. Preferably, the precoating is applied using a printing unit, wherein the printing unit is one of several printing units utilized in an offset printing process by which the tattoo is manufactured.

In step (b) of the method, reference to the application of a first layer of ink 34 means that a single color of ink may be applied, but also encompasses the application of multiple colors of ink. The ink is a skin-safe ink, and can be synthetic or of natural origin. Preferably, the ink is cosmetic grade.

In a preferred embodiment, the ink is a four-color process paste ink. The first layer of ink(s) is applied by one or more printing units. As many as six or more printing units may be used. If CMYK ink is used, the first layer of ink is applied using four printing units (one unit for each of cyan, magenta, yellow and black), as illustrated in FIG. 1 and FIG. 2.

After a first layer of ink 34 is formed on the base sheet 30 (or on the precoated base sheet), a layer of cold foil adhesive 35 applied to the first layer of ink 34. The cold foil adhesive is skin-safe and substantially transparent. Even more preferably, the cold foil adhesive is clear and uncolored. Yet even more preferably, the cold foil adhesive is an uncolored, acrylate-based adhesive. Preferably, the first adhesive layer 34 is non-continuous, meaning that the cold foil adhesive is applied to the first ink layer only in the areas to which it is intended for the foil to adhere to. Thus, step (c) referred to above may comprise applying the cold foil adhesive only to portions of the first ink layer to which the foil in step (d) is desired to be applied. As an example, in the case where the tattoo to be produced is intended to comprise a layer of foil in the shape of a horse, cold foil adhesive is applied in the two-dimensional shape of a horse to the first ink layer.

The layer of cold foil adhesive 35 is immediately followed by application of foil 36 via a printing unit, wherein the adhesive areas on the uppermost layer of the laminated structure produced thus far comes in contact with the foil at a pinch or nip point 44 between two rollers. At this point, the foil releases to the base sheet only in the areas containing the cold foil adhesive, allowing extremely precise control and registration of the foil to the base paper.

As the base sheet 30, which now includes a foil layer 38 adhered to the cold foil adhesive layer 35 passes beyond the pinch or nip point 44 between the rollers of the printing unit that applied the foil, the cold foil adhesive layer is cured so as to further secure the foil to the adhesive layer. Curing may be accomplished in a variety of ways, depending upon the particular cold foil adhesive being used. For example, curing may be accomplished by oxidation resulting from exposure to air. Alternatively, the adhesive could be flash cured using an ultraviolet (UV) lamp. After the foil is applied, a second layer of ink 38 is applied on top of the foil 36, effectively sandwiching the foil in between the first layer 34 and second layer 38 of ink. The second layer of ink preferably will be identical to the first layer of ink, in terms of colors, shape, and registration of colors. The components and application of the second layer of ink is as described herein with respect to the first layer of ink, except for the substrate onto which each layer is applied.

A second adhesive layer 40 is applied to the second layer of ink 38 (i.e., to the image). This second adhesive is a skin safe, preferably medical grade adhesive. Preferably, a medical grade, acrylate based adhesive is used.

A final step in producing the tattoo is the application of a protective top sheet 42 to the second adhesive layer 40. The purpose of the top sheet 42 is to prevent the tattoo from adhering to the skin and other surfaces, as well as adhering to other tattoos, until the user wishes to apply the tattoo to the user's skin. The top sheet also prevents the tattoo and the tattoo image from being damaged during packaging, shipping, and other times before it is applied to the user's skin. The protective top sheet is preferably substantially transparent and colorless, so that the top sheet does not obscure the view of the tattoo before it is applied to the user's skin. Most preferably, the protective top sheet is clear. The protective top sheet 42 is designed to be removable by the user. The protective top sheet can be made from a variety of materials, such as polyethylene or polypropylene.

Optionally, after application of the protective top sheet, the tattoo laminate may be cut into individual tattoos, or into smaller sheets comprising multiple tattoos.

The tattoo of the invention is intended to be used in contact with human skin, and therefore it is very important that the adhesives and inks and other components of the tattoo are skin safe, preferably cosmetic grade, meaning that they are unlikely to cause rashes or other reactions when applied to the skin.

The tattoo of the invention is applied to the skin of a human or animal by the user, in the following manner. The protective top sheet 42 is removed, such as by peeling it off, thereby uncovering the second adhesive layer 40. Immediately thereafter, the tattoo is placed on the desired position on the user's skin, with the second adhesive layer 40 in contact with the skin and the base sheet 30 farthest from the user's skin.

The tattoo is then affixed to the user's skin by applying heat, pressure and/or moisture, or a combination thereof, to the base sheet.

What is claimed is:

1. A temporary foil tattoo comprising:
   (a) a base sheet;
   (b) a first ink layer on the base sheet;
   (c) a first adhesive layer comprising cold foil adhesive on the first ink layer;
   (d) a foil layer on the first adhesive layer;
   (e) a second ink layer on the foil layer;
   a second adhesive layer on the second ink layer; and
   (g) a protective liner sheet on the second adhesive layer, wherein the protective liner sheet is removable for exposing the second adhesive layer.

2. The temporary foil tattoo of claim 1, wherein the base sheet has a thickness in the range of about 0.0004 inches to about 0.012 inches.

3. The temporary foil tattoo of claim 1, wherein the base sheet has a release coating.

4. The temporary foil tattoo of claim 3, wherein the base sheet has a release coating capable of releasing upon application of water, pressure or heat.

5. The temporary foil tattoo of claim 1, further comprising a pre-coating layer between the base sheet and the first ink layer.

6. The temporary foil tattoo of claim 5, wherein the pre-coating layer is substantially transparent and substantially colorless.

7. The temporary foil tattoo of claim 1, wherein the first adhesive layer is non-continuous.

8. The temporary foil tattoo of claim 1, wherein the first adhesive layer is uncolored.

9. The temporary foil tattoo of claim 8, wherein the first adhesive layer is acrylate-based.

10. The temporary foil tattoo of claim 1, wherein the first ink layer and/or second ink layer comprise multiple colors of ink.

11. The temporary foil tattoo of claim 1, wherein the first ink layer and/or second ink layer comprise CMYK (Cyan, Magenta, Yellow, Black) ink.

12. The temporary foil tattoo of claim 1, wherein the first ink layer and/or second ink layer are applied using a print unit of an offset printing press or a flexographic press.

13. The temporary foil tattoo of claim 12, wherein the first ink layer and/or second ink layer are applied in a 4-color process.

14. The temporary foil tattoo of claim 1, wherein the first ink layer, the first adhesive layer, the foil layer and the second ink layer are applied by a print unit in an offset printing press or flexographic printing press.

15. The temporary foil tattoo of claim 1, wherein the protective liner sheet is substantially transparent.

16. The temporary foil tattoo of claim 1, wherein the adhesive layers and ink layers are skin safe.

17. A temporary foil tattoo, comprising:
   (a) a base sheet having a release coating capable of releasing upon application of water, pressure or heat, and a substantially transparent and substantially colorless pre-coating on the base sheet;
   (b) a first ink layer on the pre-coating on the base sheet;
   (c) a first adhesive layer comprising cold foil adhesive layer on the first ink layer;
   (d) a foil layer on the first adhesive layer;
   (e) a second ink layer on the foil layer;
   a second adhesive layer on the second ink layer; and
   (g) a substantially transparent protective liner sheet on the second adhesive layer,
   wherein the protective liner sheet is removable for exposing the second adhesive layer, and wherein the first ink layer and second ink layer each form an identical image.

* * * * *

UNITED STATES PATENT AND TRADEMARK OFFICE
CERTIFICATE OF CORRECTION

PATENT NO. : 10,556,402 B1
APPLICATION NO. : 16/015094
DATED : February 11, 2020
INVENTOR(S) : Chris Huff et al.

Page 1 of 1

It is certified that error appears in the above-identified patent and that said Letters Patent is hereby corrected as shown below:

In the Claims

Column 7, Line 15, the text "a second adhesive layer" should be changed to -- (f) a second adhesive layer --; and Column 8, Line 31, the text "a second adhesive layer" should be changed to -- (f) a second adhesive layer --.

Signed and Sealed this
Nineteenth Day of May, 2020

Andrei Iancu
*Director of the United States Patent and Trademark Office*